United States Patent [19]

Smith

[11] Patent Number: 4,698,623

[45] Date of Patent: Oct. 6, 1987

[54] OVERLOAD DETECTION APPARATUS

[76] Inventor: Richard G. Smith, 5909 Western Oaks Dr., Orlando, Fla. 32808

[21] Appl. No.: 669,456

[22] Filed: Nov. 7, 1984

[51] Int. Cl.$^4$ ............................................. G08B 21/00
[52] U.S. Cl. ................................. 340/665; 200/61.08; 116/212
[58] Field of Search ............. 340/665; 116/212, 203; 200/184, 216, 61.08, 61.05, 61.47, 215

[56] References Cited

U.S. PATENT DOCUMENTS

| 3,237,590 | 3/1966 | Black | 116/212 |
| 3,515,091 | 6/1970 | Smith | 116/203 |
| 3,895,197 | 7/1975 | Mizrahi | 200/184 X |
| 4,138,600 | 2/1979 | Ozols | 200/215 X |

Primary Examiner—James L. Rowland
Assistant Examiner—Jeffery A. Hofsass
Attorney, Agent, or Firm—Macdonald J. Wiggins

[57] ABSTRACT

Apparatus for monitoring structures and structural members for overloads has an elongated frangible closed ended tube containing a dense, visible liquid. The tube includes a central reduced cross-sectional area for forming a weak portion thereof. The tube is enclosed in a transparent shield and the tube and shield resiliently attached to the structure to be monitored. The frangible tube is designed to cause the weakened area to fracture when the tube and structure are exposed to a preselected level of an acceleration force, causing the liquid to be deposited in the shield as an indication of an overload.

15 Claims, 5 Drawing Figures

OVERLOAD DETECTION APPARATUS

BACKGROUND OF THE INVENTION

Field of the Invention

The present invention relates generally to the field of apparatus for detecting when a structure or structural member has been overloaded. This field is of particular interest to the aircraft industry, among others.

SUMMARY OF INVENTION

The present invention is an inexpensive and accurate apparatus for detecting when a structure or structural member has been overloaded. It comprises an overload detection member, typically elongated, that is made so it will fracture upon overload, that is, when the structure or structural member of interest is overloaded. The overload detection member can be provided with a weak or narrowed section to facilitate or control the fracturing.

The occurrence of an overload can be detected by visual inspection of the member for fracturing or by other means, some of which are described herein by way of example. To keep the piece or pieces of the overload detection member from being scattered about upon fracturing, or for other purposes herein described, the overload detection member may be enclosed in a tube or shield.

The overload detection member, with or without an enclosing tube or shield, typically is attached at one or both ends to the structure or structural member of interest. This is accomplished by conventional means. For example, the structure or structural member may be fitted with a bracket to hold the overload detection member and to accept a new member upon fracture of the original member.

This invention is particularly useful in applications where overload of a structure or structural member could result in catastrophic consequences, such as loss of human life. The aircraft industry is an area of prime usefulness for the invention. The structural members of an aircraft experience loading during turning, banking, or changing the altitude of the aircraft during flight, and can be overloaded during these maneuvers. Repeated overloading can result in sudden failure of key structural members and subsequent destruction of the aircraft. The apparatus of the invention is typically installed at the center of gravity of the aircraft. However, it also can be installed on a specific structural member of the aircraft to monitor the loading on that particular member.

A preferred embodiment of the invention comprises a closed ended frangible inner tube containing a highly visible dense liquid, an open ended outer tube disposed about the frangible inner tube, and a pair of end closure members engaging respective ends of the two tubes. The end closure members also detachably engage a bracket member connected to the structure or structural member being monitored for overloading.

Preferably, the dense liquid filling the close ended frangible inner tube is mercury mixed with cinnabar. The cinnabar makes the mercury highly visible.

The frangible inner tube is preferably made of a temperature resistant material that will not be affected by rapid temperature changes or extremes in temperature. The frangible inner tube has a diameter at one end that narrows to a second diameter and then returns to the first diameter of the tube. Typically, the second diameter is approximately one half of the first diameter. The point where the tube narrows to the second diameter is the weak point of the tube. Although typically the second diameter is one half of the first diameter, all that is necessary is that the diameters are set so that the tube will fracture at stress equivalent to overload.

When an overload condition is experienced by the apparatus, the frangible inner tube will fracture at the weak point. When this happens, the highly visible dense liquid within the frangible inner tube is deposited in the liquid-tight enclosure about the inner tube formed by the outer tube and the end closure members. If when the frangible inner tube is inspected, the inner tube is broken, the inspector knows that the structure or structural member to which the apparatus of the invention is attached has experienced overload. If, on the other hand, the frangible inner tube is not broken, the inspector knows overload was not experienced.

The frangible inner tube, once broken, can be quickly replaced without replacing the remainder of the apparatus. First, the apparatus is removed from the bracket. Once removed, the end closure structures are pulled from the respective ends of the inner and outer tubes. After removal of the end closure members the dense liquid is poured from the outer tube and the fractured frangible inner tube is removed from within the outer tube. After removal of the fractured frangible inner tube, a new frangible inner tube and the old outer tube are again engaged with the end closure members. This assembly is then replaced in the bracket member.

An object of the invention is to provide an inexpensive and accurate apparatus for detecting when a structure or structural member has been overloaded.

Another object of the invention is to provide an apparatus in which overloading can be easily detected upon visual inspection or other simple means.

These and other objects of the invention will be described in detail in the remaining portions of the disclosure.

DESCRIPTION OF THE PREFERRED EMBODIMENT

Figure 1:
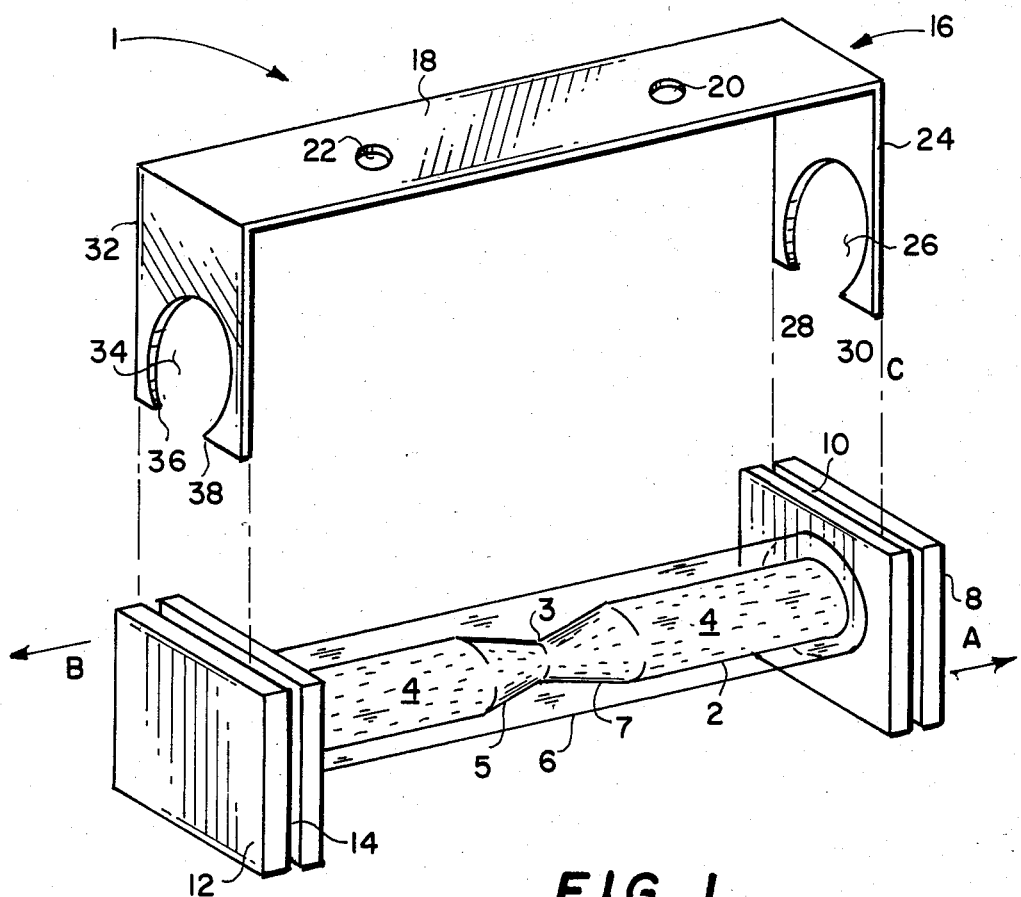
FIG. 1 shows a partially exploded view of a preferred embodiment of the overload detection apparatus of the invention.

Referring to FIG. 1, generally at 1, a partially exploded view of the preferred embodiment of the overload detection apparatus of the invention is shown. The apparatus of the invention has close ended frangible inner tube 2 filled with dense liquid 4, an open ended outer tube 6 disposed about and spaced away from tube 2, end closure members 8 and 12 engaging the respective ends of the tubes 2 and 6 for maintaining the tubes in their spaced apart relationship, and bracket member 16 detachably fixed to the end closure members for connecting the two tubes and the end closure members to a structure or structural member of, for example, an aircraft being monitored for overloading.

Frangible tube 2 in the preferred embodiment is close ended and filled with a dense liquid, as described. However, frangible tube 2 can be replaced by any elongated frangible member which has a weak point and will fracture at that weak point at overload, e.g., a solid glass rod with a defined weak point.

Preferably, dense liquid 4 is mercury colored with cinnabar. The mixture of mercury and cinnabar provides a highly visible material that is easy to see when the apparatus is inspected to determine if the inner tube has been fractured and hence that overloading has been experienced by an aircraft. Although in the preferred embodiment the liquid is highly visible, it does not have to be so. The dense liquid is highly visible merely to aid the inspector to determine if tube 2 has fractured. Also, the liquid does not have to be dense. Although a dense liquid like mercury is preferred, a liquid of less density can be used. However, the density of the liquid will affect the dimensions of the frangible tube.

Frangible inner tube 2 is preferably constructed of a heat resistant material. This is because the apparatus, when used on, for example, an aircraft is subjected to extreme temperatures during a normal flight. When the aircraft is at high altitudes, the apparatus is subjected to very low temperatures, and likewise, if the aircraft is on the ground, it can be subjected to high temperatures. By making the tube out of temperature resistant material, the frangible inner tube will not fracture when experiencing these temperature extremes or rapid temperature changes.

Frangible inner tube 2 narrows, along incline section 7, from its first diameter to the second diameter at 3. From the second diameter at 3, the tube widens, along incline section 5, back to the first diameter. The second diameter at 3 is approximately one-half the first diameter of tube 2. The point along tube 2 where it has the second diameter is the weak point of the tube.

Frangible tube 2 is the portion of the apparatus of the invention that responds to the loading experienced by the structure or structural member to which it is attached. When frangible tube 2 fractures, the dense liquid is emptied from frangible tube 2. It is the fracturing of tube 2 that evidences overloading of the structure or structural member. Therefore, the invention can be practiced with an overload detection apparatus comprising nothing more than a frangible member, such as frangible tube 2, which is connected to the structure or structural member being monitored for overloading.

Outer tube 6 is disposed about and spaced away from frangible inner tube 2. Tube 6 has a diameter greater than the first diameter of tube 2. Tube 6 is open ended and preferably made of a transparent, strong, durable material so it will generally protect the fragile frangible inner tube 2 and contain it and its contents upon fracture. Although outer tube 6 is concentrically disposed in the preferred embodiment, this is not necessary. Any disposition of the outer tube about inner tube 2 is acceptable if it, along with the end closure members 8 and 12, form a liquid-tight enclosure around the inner tube.

Bracket member 16 has a top member 18 with holes 20 and 22 defined therein. Holes 20 and 22 are for connecting the bracket member to the structure or structural member being monitored for overloading. Holes 20 and 22 are for disposition of connecting means, such as screws. However, other means, such as adhesives, can be used for connecting the bracket member to the structure or structural member being monitored for overloading.

Disposed from the ends of top member 18 are downward extending side members 24 and 32, respectively. Side member 24 has disposed from its distal end upwardly extending circular shaped cut out 26. Circular shaped cut out 26 is disposed from the opening in the distal end of side member 24 between points 28 and 30. An extension of the distal end between points 28 and 30 across the opening defines the bottom of cut out 26 and forms a chord less than the diameter of circular shaped cut out 26.

Side member 32 has disposed from its distal end upwardly extending circular shaped cut out 34. Cut out 34 is substantially the same as the circular cut out 26 in side member 24. Circular shaped cut out 34 is disposed from the opening in the distal end of side member 32 between points 36 and 38. An extension of the distal end between points 36 and 38 across the opening defines the bottom of the cut out and forms a chord less than a diameter of circular shaped cut out 34.

Bracket member 16 is the preferred member for attaching tubes 2 and 6, and end closure members 8 and 12 to the structure or structural member being monitored for overloading. It is within the scope of the invention that other means can be used to attach the apparatus of the invention to the structure or structural member being monitored for overloading, as long as these means will not prevent the fracturing of tube 2 at overload.

Figure 2:
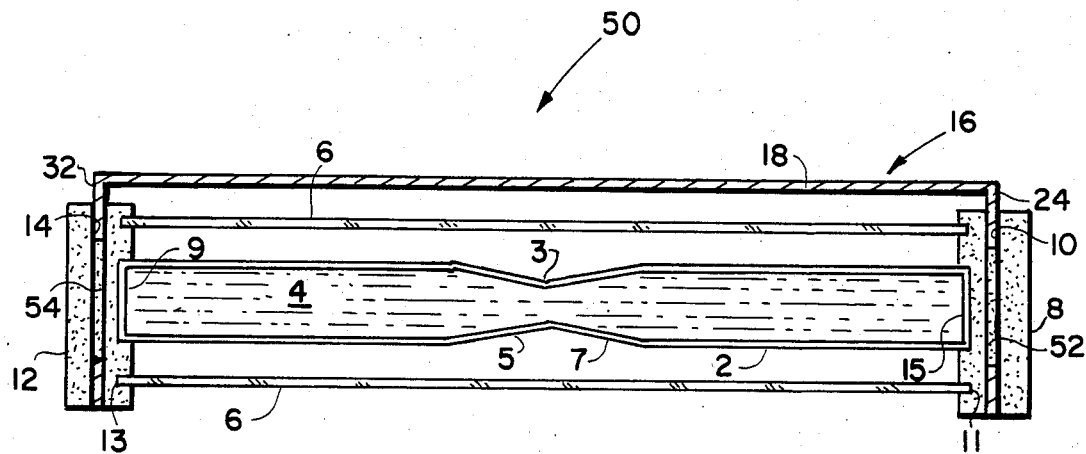
FIG. 2 shows a longitudinal cross-sectional view of the preferred embodiment shown in FIG. 1 prior to the apparatus experiencing overloading.

End closure members 8 and 12 have continuous circumferentially disposed grooves 10 and 14 disposed around their edges, respectively. Grooves 10 and 14 are cut to provide a circular core member (FIG. 2) within each groove. The circular core members have a diameter slightly less than the diameter of the respective circular shaped cut outs 26 and 34 in sides members 24 and 32 of bracket 16. Since the end closure members 8 and 12 are constructed of rubber, tubes 2 and 6 with the engaged end closure members 8 and 12 are moved in a direction opposite the direction C such that the circular shaped cut outs 26 and 34 of sides members 24 and 32 are disposed in grooves 10 and 14, respectively, around the circular core members (FIG. 2). It is necessary to depress the thickness of the circular core members in order for edges 28 and 30 of side member 24, and edges 36 and 38 of side member 32, to move past the respective circular core members. Once the cut outs are disposed around the core members, the two tubes and the end closure members 8 and 12 wil remain attached to bracket member 16 until physically removed.

Referring to FIG. 2, generally at 50, the longitudinal cross-sectional view of the preferred embodiment of the apparatus of the invention in its assembled condition is shown. As shown, circular cut out 26 (FIG. 1) of side member 24 is disposed in groove 10 about circular core member 52, and circular cut out 34 (FIG. 1) of side member 32 is disposed in groove 14 about circular core member 54. The inside surface of end closure 8 engages first closed end 15 of tube 2 and first open end 11 of tube 6 in a detachably sealable relationship. The inside surface of end closure 12 engages second closed end 9 of tube 2 and second open end 13 of outer tube 6 in a detachably sealable relationship. The end closure structures 8 and 12 maintain tubes 2 and 6 in their spaced apart relationship.

Figure 3:
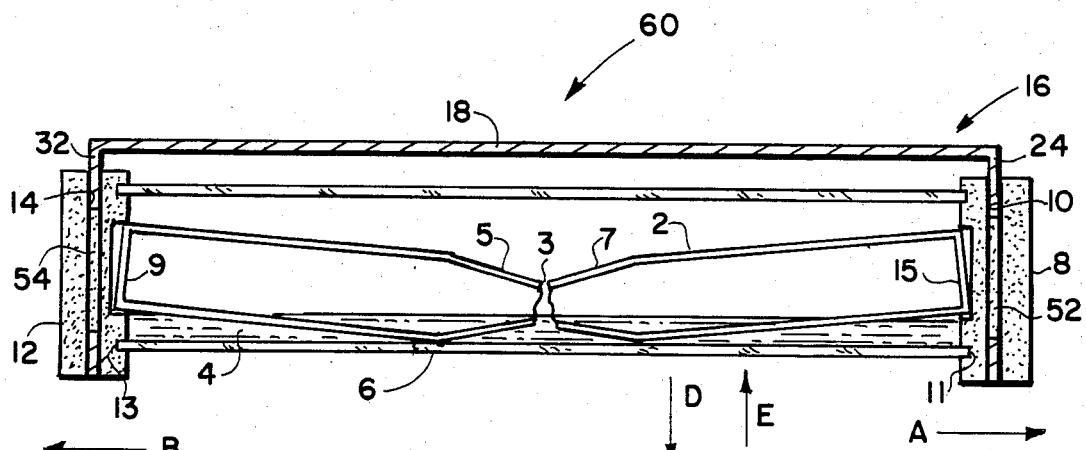
FIG. 3 shows a longitudinal cross-sectional view of the preferred embodiment shown in FIG. 1 after the apparatus has experienced overloading.

Referring to FIGS. 2 and 3, the method by which the apparatus of the invention is used to detect overloading will be described.

Prior to experiencing overloading, the apparatus attached to a structure or structural member being monitored for overloading is as shown in FIG. 2. When overloading is experienced, tube 2 will fracture. The amount of loading that will fracture tube 2 can be adjusted in a number of ways, for example, by varying the length or diameter of the frangible inner tube or the formation of the weak point.

As will be understood, rubber closure members 12 tend to isolate inner tube 2 from the structural member to which the device 50 is mounted. When acceleration (G forces) which occur which would overload the structural member, the same forces will be applied to inner tube 2. Such forces cause the masses formed by liquid 4 and the glass walls of inner tube 2 on either side of the central weakened area 3 to tend to force to force tube 2 in the direction of the force. Since the ends 9 and 15 of tube 2 are constrained from moving by bracket member 16, a moment is generated about the central weakened area 3. From a knowledge of the masses of the inner tube 2 and the characteristics of the material, such as glass, from which frangible tube 2 is made, the device may be designed such that tube 2 will fracture at weak point 3 at a preselected G force. Therefore, When overloading is experienced by the apparatus of the invention, frangible inner tube 2 will fracture at the weak point at 3, as shown in FIG. 3. When tube 2 fractures, dense liquid 4, which is preferably highly visible, is deposited in the enclosure formed by tube 6 and end closures 8 and 12. Since the enclosure is liquid-tight, it will receive and hold liquid 4. After the flight when the inspector inspects the aircraft structure for overloading, he can easily see that the frangible inner tube has been fractured by the dense liquid 4 being disposed in the enclosure.

To place the apparatus back in its original unfractured form, as shown in FIG. 2, end closure members 8 and 12, outer tube 6, and fractured frangible tube 2 are moved in direction D out of attachment with bracket member 16. Once removed from bracket member 16, end closure member 8 is moved in direction A out of engagement with the ends of tubes 2 and 6, and end closure member 12 is moved in direction B out of engagement with the opposite ends of tubes 2 and 6. After end closure members 8 and 12 are removed, the fractured frangible inner tube 2 is removed from within in tube 6 and the liquid is poured from within the outer tube. In this disassembled condition, outer tube 6 and the end closure members are appropriately cleaned. After cleaning, the apparatus is reassembled with a new nonfractured frangible inner tube 2 and moved in direction E so that it is again detachably fixed to bracket member 16 attached to the structure or structural member being monitored for overloading.

A second embodiment of the apparatus of invention is configured essentially the same as the preferred embodiment of the apparatus shown in FIGS. 1 and 2, except that a different method is used to provide a visual indication when frangible inner tube 2 has fractured due to overloading. In this second embodiment, dense liquid 4 within frangible tube 2 is not highly visible. Disposed within the enclosure formed by outer tube 6 and end closure members 8 and 12 is a material that is chemically reactive with the dense liquid disposed within frangible inner tube 2. This material is also not highly visible. However, upon fracturing of tube 2, the dense liquid mixes with the material disposed in the enclosure. When they mix, a highly visible material is produced. The material disposed in the enclosure can be a gas, liquid or solid, as long as it will allow for proper fracturing of frangible inner tube 2.

When it is desired to replace the frangible inner tube 2 subsequent to overload detection, the apparatus is disassembled as described for the preferred embodiment and reassembled with a new frangible inner tube 2. The material chemically reactive with the dense liquid is disposed during assembly in the enclosure formed by outer tube 6 and end closure members 8 and 12.

Figure 4:
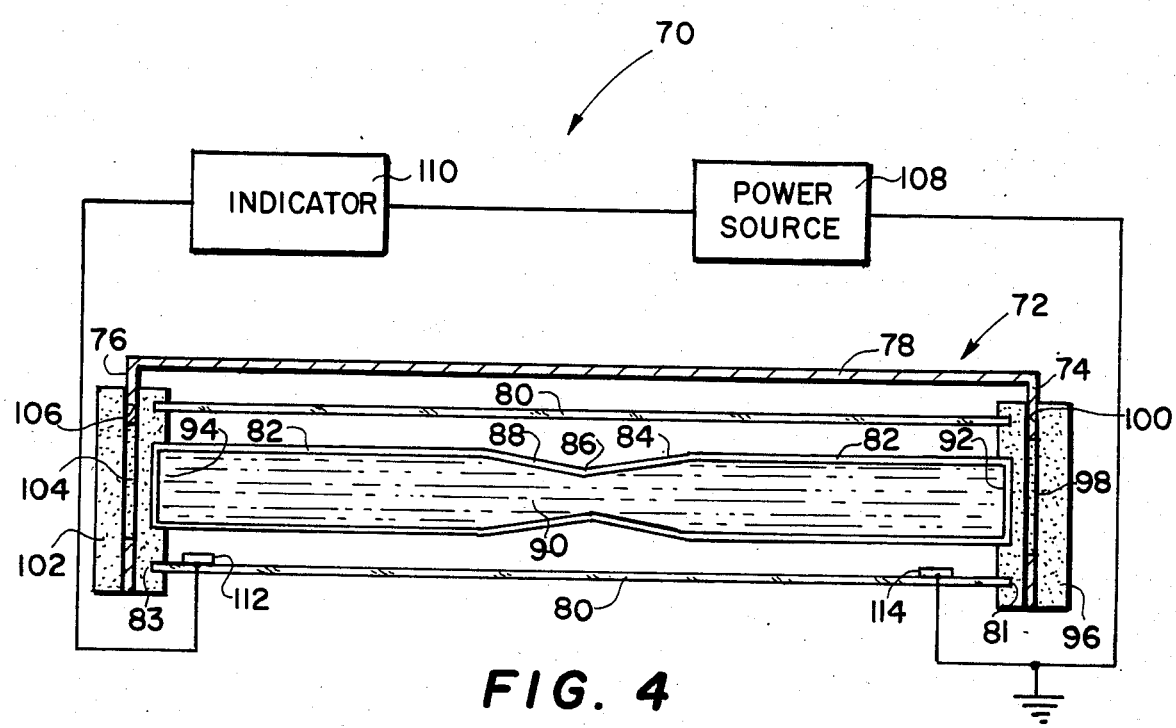
FIG. 4 shows a longitudinal cross-sectional view of another embodiment prior to the apparatus experiencing overloading.

Referring to FIG. 4, generally at 70, and FIG. 5, generally at 120, a third embodiment of the overload detection apparatus of the invention will be described. Referring to FIG. 4, the third embodiment of the invention has bracket 72 having top 78 and side members 74 and 76 disposed downwardly from respective ends of top member 78. Top member 78 is connected by conventional means to the structure or structural member being monitored for overload detection. Side members 74 and 76 of bracket member 72 are similar to those shown for the preferred embodiment of the invention in FIG. 1. The respective cut outs in the side members 74 and 76 are disposed in grooves 100 and 106 around core members 98 and 104 of end closure members 96 and 102, respectively. Frangible inner tube 82 has its ends 92 and 94 engaged by end closure members 96 and 102, respectively. Frangible inner tube 82 narrows, along incline 84, to a second diameter at 86, and widens from the second diameter, along incline 88, to the original diameter. The second diameter at 86 is the weak point of the frangible inner tube.

Frangible inner tube 82 is preferably constructed of a temperature resistant material. Dense liquid 90 disposed in frangible inner tube 82 is preferably both highly visible and electrically conductive. The highly visible electrically conductive dense liquid is preferably mercury colored with cinnabar.

Disposed about but spaced away from frangible inner tube 82 is outer tube 80. Ends 81 and 83 of tube 80 are engaged in a detachably sealable relationship with end closure members 96 and 102, respectively. Outer tube 80 and end closure members 96 and 102 form a liquid-tight enclosure around frangible inner tube 82. The outer tube 80 is preferably made of a transparent, strong, durable material that is not electrically conductive.

Disposed in the enclosure formed by outer tube 80 and end closure members 96 and 102 are two spaced apart connection pads 112 and 114. Indicator 110 is connected on one side to connection pad 112 and is connected on a second side to power source 108. Power source 108 on a second side is connected to connection pad 114 and ground. The circuit including indicator 110 is open before fracture of inner tube 82, since there is no connection between connection pads 112 and 114. Indicator 110 can be any conventional electrically activated device such as a light or a buzzer.

Figure 5:
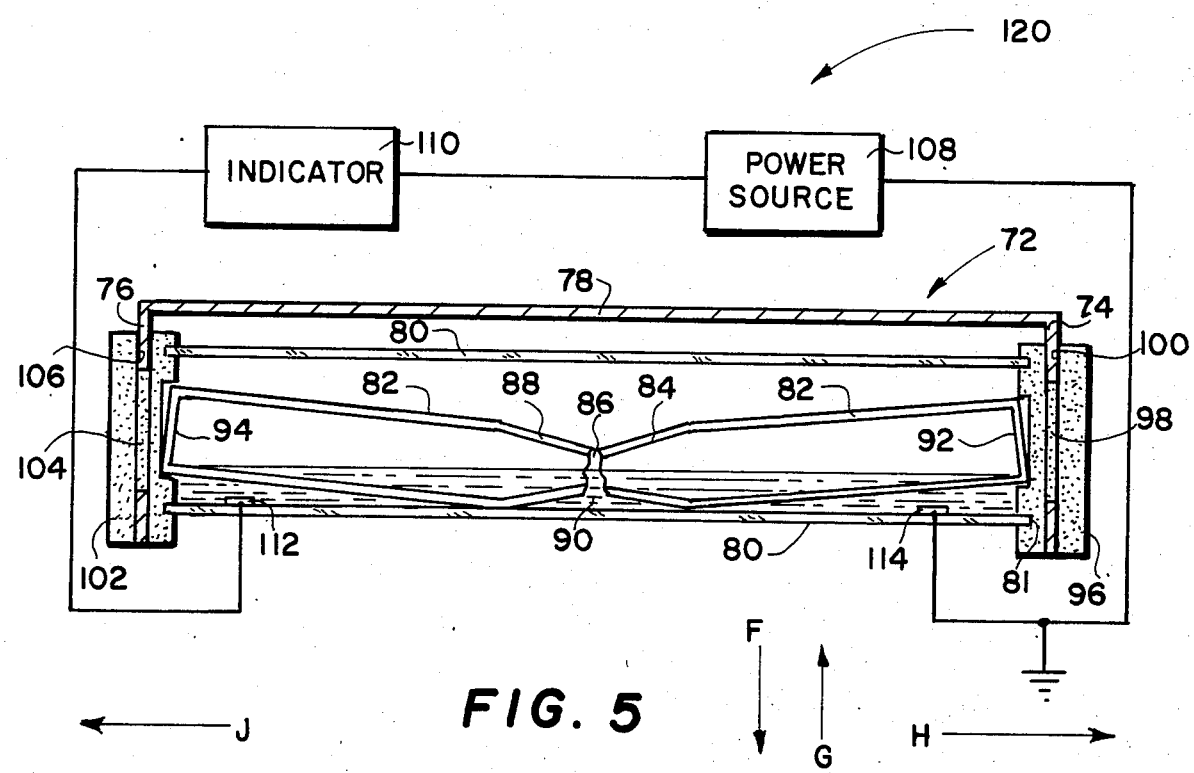
FIG. 5 shows a longitudinal cross-sectional view of the embodiment shown in FIG. 4 after the apparatus has experienced overloading.

Referring to FIGS. 4 and 5, the method by which an overload is indicated by the apparatus disclosed in the third embodiment will be described.

When the apparatus of the third embodiment experiences overload, frangible inner tube 82 will fracture at the weak point at 86. When tube 82 fractures, electrically conductive dense liquid 90 is deposited in the enclosure surrounding frangible tube 82 formed by outer tube 80 and end closure members 96 and 102. When the electrically conductive dense liquid 90 is deposited in the enclosure, an electrical path is formed between pads 112 and 114 in the enclosure, the electrical circuit is completed, and indicator 110 is activated.

Indicator 110 is generally disposed in the cockpit and will indicate to the pilot when an overload condition has been experienced by the aircraft. By any conventional means, such as an on/off switch attached to indicator 110, the pilot can turn off the indicator once it has made its indication that an overload condition has been experienced. After the aircraft has landed, the inspector can inspect the overload detection apparatus to ensure that there was a proper indication to the pilot that an overload condition was experienced. If frangible inner tube 82 is not fractured, the inspector knows that there was a false indication of an overload condition. However, if frangible inner tube 82 is fractured and the highly visible electrically conductive dense liquid 90 is deposited in the enclosure, the inspector knows the aircraft did experience overloading.

When it is desired to replace frangible inner tube 82, the end closure members, and tubes 80 and 82 are moved in direction F out of engagement with bracket member 72. Once moved in direction F, the end closure members 96 and 102 are moved in directions H and J, respectively, to remove them from the ends of the two tubes. Once one of the end closure members have been removed, electrically conductive dense liquid 90 is poured from tube 80. Fractured frangible inner tube 82 is then removed, and a new frangible inner tube replaces the old fractured one. New frangible inner tube 82 and outer tube 80 have their ends engaged by the two end closure members, then this assembly is moved in direction G, so that the openings in side members 74 and 76 of bracket member 72 are disposed around core members 98 and 104 of end closures 96 and 102, respectively. Once in this position, indicator 110 has its on/off switch placed in an on mode, and the apparatus is again prepared to monitor the aircraft for overloading.

Although the above described embodiment of the invention are described for use in determining an overload condition for the structure or structural members of an aircraft, it is within the scope of the invention that the overload detection apparatus of the invention can be used to detect overloading of any structure or structural member which is subjected to loading because of movement of the structure or structural member.

The terms and expressions that are employed here are used as terms of description and not of limitation. And there is no intention, in the use of such terms and expressions, of excluding the equivalence of the features shown, and described, or portions thereof, it being recognized that various modifications are possible in the scope of the invention as claimed.

I claim:

1. A device for detecting an overload of a structural member comprising:
   an elongated frangible tube having closed ends thereof, said frangible tube having a central reduced cross-sectional area thereof for forming a weakened portion of said tube;
   a liquid substantially filling said closed ended frangible tube;
   an elongated open ended outer tube disposed about and spaced from said frangible tube; and
   bracket means for closing said open ends of said outer tube, for resiliently supporting said closed ends of said frangible tube, and for attachment to said structural member whereby said frangible tube will fracture when said tube is subjected to a predetermined overload.

2. The device as recited in claim 1 in which said liquid is a dense liquid.

3. The device as recited in claim 1 in which said bracket means includes:
   a rigid bracket for attachment to said structural member; and
   a pair of resilient end closure members disposed in said bracket, said end closure members supporting said closed ends of said frangible tube and closing said open ends of said outer tube.

4. The device as recited in claim 1 in which said frangible tube is formed from heat resistant glass.

5. The device as recited in claim 1 in which said liquid is mercury.

6. The device as recited in claim 1 in which said liquid is colored to be highly visible.

7. An apparatus for detecting overloading of a structure or structural member comprising:
   an overload detection member that will fracture when subjected a load equivalent to overloading of the structure or structural member, said member having an elongated closed ended first tubular member filled with an electrically conductive liquid, said first tubular member having a weak section along its length to facilitate fracturing of the first tubular member upon overload;
   a shield for disposition about the overload detection member, said shield having an open ended second tubular member disposed about and spaced away from the first tubular member;
   means for attaching the overload detection member and shield to the structure or structural member, said attaching means having a pair of resilient end closure members that engage the respective ends of the first and second tubular members, wherein the end closure members and the second tubular member form a liquid-tight enclosure about the first tubular member; and
   a circuit having a power source, an indicator means connected to the power source, and a pair of spaced apart connection pads in the enclosure connected to the power source and indicator means, respectively.

8. The apparatus as recited in claim 7, wherein an electrical path is provided between the connection pads to cause the indicator means to be placed in an on condition when the first tubular member is fractured due to overloading and the liquid is deposited in said enclosure across the connection pads.

9. The apparatus as recited in claim 7, wherein the electrically conductive liquid is highly visible.

10. The apparatus as recited in claim 9, wherein the liquid is a dense liquid.

11. An apparatus for detecting overloading of a structure or structural member comprising:
    an overload detection member that will fracture when subjected to a load equivalent to overloading of the structure or structural member, said member having an elongated closed ended first tubular member filled with a liquid, said first tubular member having a weak section along its length to facilitate fracturing of the first tublar member upon overload;
    a second transparent tubular member disposed about the overload detection member, said second tubular member being open ended and disposed about and spaced away from the first tubular member;

means for attaching the overload detection member and second tubular member to the structure or structural member, said attaching means having a pair of resilient end closure members that engage the respective ends of the first and second tubular members, wherein the end closure members and the second tubular member form a liquid-tight enclosure about the first tubular member; and said second tubular member has disposed therein a material chemically reactive with said liquid such that after the overload detection member is fractured due to overloading and the liquid is deposited in the enclosure, the resulting mixture of the liquid and material is highly visible.

12. The apparatus as recited in claim 11 wherein the liquid is a dense liquid.

13. The method as recited in claim 11 wherein determining whether or not the frangible tube is fractured further comprises the steps of visually inspecting the enclosure to determine if a liquid contained within the frangible tube has been deposited in the enclosure and the liquid is mixed with a material chemically reactive with the liquid that is disposed within the enclosure to form a highly visible mixture within the disclosure.

14. A method of monitoring a structure for exposure to overloading comprising the steps of:

providing an elongated frangible tube having a weakened central portion thereof;

filling the frangible tube with a dense electrically conductive liquid and closing the ends of the tube;

disposing the frangible tube within a transparent shield tube and closing the ends of the shield tube;

supporting the ends of the frangible tube and the shield tube in resilient mounts;

attaching the resilient mounts to a structure to be monitored to expose the frangible tube to acceleration forces to which the structure is exposed; and activating an indicator means in a circuit electrically connected to contacts within the shield tube when the frangible tube has fractured.

15. A method of monitoring a structure for exposure to overloading comprising the steps of:

providing an elongated frangible tube having a central reduced cross-sectional area thereof for forming a weakened portion of the frangible tube;

filling the frangible tube with a dense visible liquid and closing the ends of the frangible tube;

disposing the frangible tube within an elongated open ended transparent outer tube disposed about and spaced from said frangible tube;

closing the ends of the outer tube;

attaching a pair of brackets to a structure to be monitored for overloading;

resiliently mounting the frangible tube within the outer tube between the pair of brackets to expose the frangible tube to moments to which the structure is exposed whereby the weakened portion of the frangible tube will fracture at a preselected overload value; and periodically inspecting the outer tube for determining whether the frangible tube has fractured.

* * * * *